United States Patent [19]

Sivavec

[11] Patent Number: 4,980,424

[45] Date of Patent: Dec. 25, 1990

[54] CAPPING OF POLYPHENYLENE ETHERS BY REACTION WITH 5-HYDROXYTRIMELLITIC COMPOUNDS OR DERIVATIVES THEREOF

[75] Inventor: Timothy M. Sivavec, Clifton Park, N.Y.

[73] Assignee: General Electric Company, Schenectady, N.Y.

[21] Appl. No.: 474,879

[22] Filed: Feb. 5, 1990

[51] Int. Cl.$^5$ ............................................. C08G 65/48
[52] U.S. Cl. ..................................... 525/397; 528/214
[58] Field of Search .......................... 525/397; 528/214

[56] References Cited

U.S. PATENT DOCUMENTS

| | | | |
|---|---|---|---|
| 4,600,741 | 7/1986 | Aycock et al. | 524/139 |
| 4,642,358 | 2/1987 | Aycock et al. | 549/245 |
| 4,760,118 | 7/1988 | White et al. | 525/397 |
| 4,808,671 | 2/1989 | Sivavec | 525/397 |

*Primary Examiner*—Harold D. Anderson
*Attorney, Agent, or Firm*—William H. Pittman; James C. Davis, Jr.

[57] ABSTRACT

Polyphenylene ethers are capped by reaction in the melt with at least one derivative of 3-hydroxytrimellitic acid, preferably the 5-hydroxy or 5-acetoxy derivative of trimellitic anhydride or of a monoester thereof. The capped polyphenylene ether is capable of forming copolymers with polyamides.

20 Claims, No Drawings

CAPPING OF POLYPHENYLENE ETHERS BY REACTION WITH 5-HYDROXYTRIMELLITIC COMPOUNDS OR DERIVATIVES THEREOF

This invention relates to carboxylated polyphenylene ethers, and more particularly to a class of improved carboxylated polyphenylene ethers capable of forming compatible resinous compositions when blended with polyamides.

The polyphenylene ethers are a well known class of polymers, characterized by a unique combination of chemical, physical and electrical properties over a temperature range of more than 350° C., extending from a brittle point of about −170° C. to a heat distortion temperature of about 190° C. This combination of properties renders them suitable for use as engineering thermoplastics in a broad range of applications which are well known in the art and are disclosed in numerous patents and other publications.

In recent years, there has been considerable interest in combining polyphenylene ethers with other resins to produce compositions with even more advantageous properties. For example, such polymers as polyamides are frequently noted for their solvent resistance, and blends of such polymers with polyphenylene ethers might be expected to possess the advantageous properties of the latter and in addition be highly resistant to solvents. However, simple blends of polyphenylene ethers and polyamides are generally incompatible, frequently undergoing phase separation and delamination. They typically contain large, incompletely dispersed polyphenylene ether particles and no phase interaction between the two resin phases.

A successful approach to compatibilization of polyphenylene ethers with polyamides involves functionalization of the polyphenylene ether by reaction with a molecule containing, for example, carboxylic acid groups. Said groups can then undergo reaction with the polyamide to form a copolymer. In addition to being inherently stable, such copolymers serve as compatibilizers for blends of unfunctionalized polyphenylene ether with polyamide, thus improving such properties as impact strength and tensile strength.

U.S. Pat. No. 4,642,358 describes the reaction of polyphenylene ethers with such polycarboxylic reactants as trimellitic anhydride acid chloride (TAAC). The product is useful as a compatibilizer for polyphenylene ether-polyamide blends, as disclosed and claimed in U.S. Pat. No. 4,600,741.

A disadvantage of the reaction of polyphenylene ethers with TAAC is that it must be conducted in solution, typically in an organic solvent such as toluene. Polyphenylene ethers are often melt processed rather than solution processed, in which case the requirement of solution functionalization is undesirable. Moreover, the products prepared by this method frequently coagulate, contain large proportions of fines and have substantial chloride content. All of these conditions may be disadvantageous for many utilities of the resulting blends.

In U.S. Pat. No. 4,808,671, there is described the reaction of polyphenylene ethers with 4-esters of trimellitic anhydride in the presence of a catalytic amount of at least one triaryl phosphite. This process may be conducted in the melt, and may utilize such trimellitic acid esters are the 4-(o-carbophenoxyphenyl) ester, also known as the 4-(phenyl salicylate) ester, of trimellitic anhydride. Esters of this type react with polyphenylene ethers in two ways: by functionalizing it with functionality derived from the 4-ester of trimellitic anhydride, and by capping unfunctionalized molecules with salicylate in accordance with U.S. Pat. No. 4,760,118. The disadvantage of this method is the requirement for triaryl phosphite catalysis in order to promote complete reaction. In the absence of triaryl phosphite, the functionalization reaction is incomplete and substantial proportions of residual trimellitic anhydride 4-ester may remain in the production, with possible detrimental The present invention is based on the discovery of a class of compounds capable of reaction with polyphenylene ethers to produce dicarboxylate-capped polyphenylene ethers capable of copolymer formation with polyamides. The capping reaction proceeds rapidly and in high yield under melt conditions.

Accordingly, the invention is directed to dicarboxylate-capped polyphenylene ether compositions prepared by melt blending at least one polyphenylene ether with at least one compound of the formula

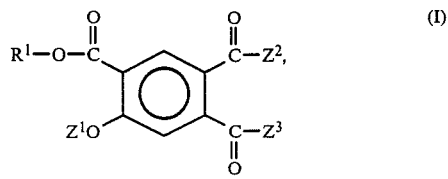

wherein $R^1$ is hydrogen, alkyl or a $C_{6-10}$ aromatic hydrocarbon radical, $Z^1$ is hydrogen or acyl, each of $Z^2$ and $Z^3$ is OH or $OR^2$ or $Z^2$ and $Z^3$ taken together are —O—, and $R^2$ is $C_{1-4}$ alkyl.

An important feature of the invention is the fact that reaction between the polyphenylene ether and the trimellitic compound occurs in a practical manner without the action of catalysts. Therefore, in a preferred embodiment the materials blended consist essentially of the aforementioned materials.

The polyphenylene ethers used in the present invention are a well known class of polymers. They are widely used in industry, especially as engineering plastics in applications requiring toughness and heat resistance. Since their discovery, they have given rise to numerous variations and modifications all of which are applicable to the present invention, including but not limited to those described hereinafter.

The polyphenylene ethers comprise a plurality of structural units having the formula

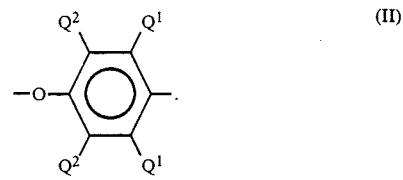

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent, provided substantial proportions of free hydroxy groups remain present. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.35–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

Particularly useful polyphenylene ethers for the purposes of this invention are those which comprise molecules having at least one of the end groups of the formulas

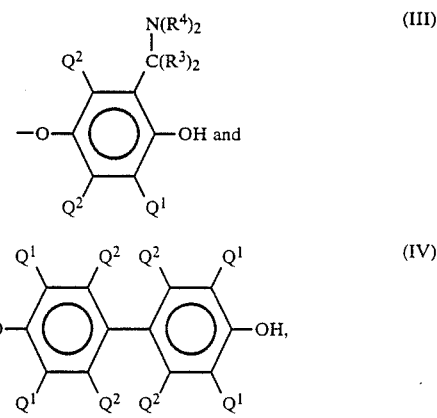

wherein $Q^1$ and $Q^2$ are as previously defined; each $R^3$ is independently hydrogen or alkyl, with the proviso that the total number of carbon atoms in both $R^3$ radicals is 6 or less; and each $R^4$ is independently hydrogen or a $C_{1-6}$ primary alkyl radical. Preferably, each $R^3$ is hydrogen and each $R^4$ is alkyl, especially methyl or n-butyl.

Polymers containing the aminoalkyl-substituted end groups of formula III may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy groups on the terminal unit of the polymer chain. During further processing and/or blending, the aminoalkyl-substituted end groups may undergo various reactions, probably involving a quinone methide-type intermediate of the formula

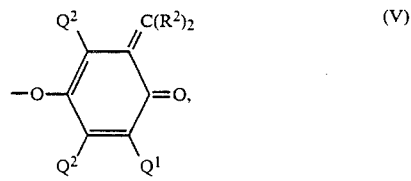

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula IV are typically obtained from reaction mixtures in which a by-product diphenoquinone of the formula

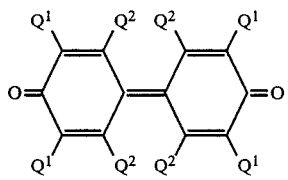   (VI)

is present, especially in a copper-halide-secondary or tertiary amine system. In this regard, the disclosure of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

It will be apparent to those skilled in the art from the foregoing that the polyphenylene ethers contemplated for use in the present invention include all those presently known, irrespective of variations in structural units or ancillary chemical features.

According to the present invention, the polyphenylene ether is melt blended with at least one trimellitic compound of formula I. In that formula, $R^a$ may be hydrogen or alkyl, usually $C_{1-6}$ alkyl such as methyl, ethyl, 1-propyl, 2-propyl, 1-butyl, 2-butyl, 1-hexyl or 1-(2-methylpentyl). It may also be an aromatic hydrocarbon radical such as phenyl, tolyl, xylyl, 1-naphthyl or 2-naphthyl.

It will be apparent that the trimellitic compound may be a tricarboxylic acid or a functional derivative thereof in which one or more carboxylic acid groups have been esterified or converted to an anhydride group. The preferred trimellitic compounds, in most instances, are those in which RI is hydrogen, methyl or phenyl, with hydrogen and phenyl especially preferred by reason of particularly high capping yields, and in which $Z^2$ and $Z^3$ taken together are —O—; that is, the preferred compounds are derivatives of 3-hydroxytrimellitic anhydride.

The $Z^1$ value may be hydrogen or an acyl radical such as acetyl, propionyl or benzoyl. Hydrogen and acetyl are usually preferred.

The melt blending operation may be performed in conventional melt blending apparatus of both the batch and continuous type. It is often preferably conducted continuously in an extruder, by reason of the excellent properties of extruded materials and the availability of extruders in commercial polymer processing facilities. Typical conditions include temperatures in the range of about 225°–350° C., preferably about 275°–325° C. The proportion of trimellitic compound employed is not critical and will depend on the degree of dicarboxylate capping desired. It is most often about 3–10% but may be as high as about 20% by weight based on polyphenylene ether. While the invention is not dependent on theory, it is believed that the trimellitic compound is converted, under the conditions employed, to a ketene of the formula

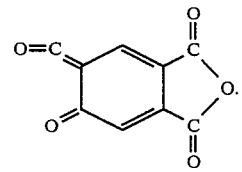   (VII)

This ketene then reacts with the hydroxy group of the polyphenylene ether to form an end group of one of the formulas

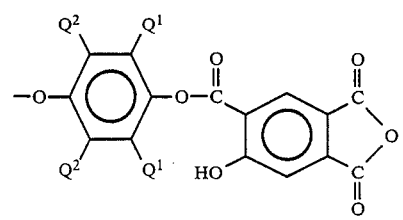   (VIII)

and

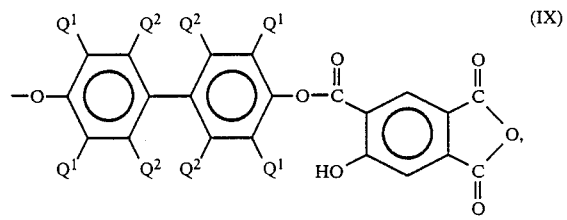   (IX)

wherein $Q^1$ and $Q^2$ are as previously defined. A hydroxy compound of the formula Z-OH, wherein Z is as previously defined, is a by-product. Compositions comprising polyphenylene ethers having at least one of the end groups of formulas VII and VIII are another aspect of the invention.

The preparation of the dicarboxylate-capped polyphenylene ethers of this invention is illustrated by the following examples. All parts are by weight. The polyphenylene ethers employed were commercially available poly(2,6-dimethyl-1,4-phenylene ethers).

EXAMPLES 1–7

Samples of a polyphenylene ether having an intrinsic viscosity in chloroform at 25° C. of 0.44 dl./g. were dry blended with various proportions of trimellitic compounds and the blends were charged to a cylindrical tube and heated at about 280° C. for about 3 minutes in a nirogen atmosphere. The mixtures were cooled, transferred to a beaker, dissolved in hot toluene and precipitated by addition of methanol. The precipitated was removed by filtration, washed with methanol and vacuum dried. The products were subjected to Fourier transform infrared spectroscopic analysis, which showed the presence of a hydroxy radical in the correct position and also indicated the proportion of capped polyphenylene ether present. The relevant details are given in Table I.

TABLE I

| | Example | | | | | | |
|---|---|---|---|---|---|---|---|
| | 1 | 2 | 3 | 4 | 5 | 6 | 7 |
| Trimellitic compound: | | | | | | | |
| $R^1$ | H | H | H | H | H | $C_6H_5CO$ | $CH_3CO$ |
| $Z^1$ | H | $CH_3CO$ | $CH_3CO$ | $CH_3CO$ | $CH_3CO$ | H | H |
| $Z^2$ | OH | | | | | | |
| $Z^3$ | OH | O | O | O | O | O | O |
| Percent by wt.* | 10 | 10 | 8 | 6 | 4 | 10 | 10 |
| Percent capping | 95 | 95 | 91 | 91 | 85 | 94 | 53 |

*Based on polyphenylene ether.

EXAMPLE 8

A mixture of 454 grams of a polyphenylene ether having an intrinsic viscosity in chloroform at 25° C. of 0.49 dl./g. and 36 grams of 5-acetoxytrimellitic anhydride was dry blended in a Henschel mill and extruded on a single-screw extruder at temperatures in the range of 270°–275° C. The extrudate was quenched in water and pelletized. A portion of the pellets was dissolved in toluene, filtered, precipitated with methanol, vacuum dried and analyzed by Fourier transform infrared spectroscopy, which showed that 96% functionalization had occurred.

The dicarboxylate-capped polyphenylene ether compositions of this invention are useful in the preparation of compatibilized blends of polyphenylene ethers with polyamides. In particular, said functionalized polyphenylene ethers form copolymers with polyamides, which may be used for compatibilization of such blends.

Polyamides suitable for use in copolymer preparation may be made by any known method, including the polymerization of a monoamino-monocarboxylic acid or a lactam thereof having at least 2 carbon atoms between the amino and carboxylic acid group, of substantially equimolar proportions of a diamine which contains at least 2 carbon atoms between the amino groups and a dicarboxylic acid, or of a monoaminocarboxylic acid or a lactam thereof as defined above together with substantially equimolar proportions of a diamine and a dicarboxylic acid. (The term "substantially equimolar" proportions includes both strictly equimolar proportions and slight departures therefrom which are involved in conventional techniques for stabilizing the viscosity of the resultant polyamides.) The dicarboxylic acid may be used in the form of a functional derivative thereof, for example, an ester or acid chloride.

Examples of the aforementioned monoaminomonocarboxylic acids or lactams thereof which are useful in preparing the polyamides include those compounds containing from 2 to 16 carbon atoms between the amino and carboxylic acid groups, said carbon atoms forming a ring with the —CO—NH— group in the case of a lactam. Particular examples of aminocarboxylic acids and lactams are ε-aminocaproic acid, butyrolactam, pivalolactam, ε-caprolactam, capryllactam, enantholactam, undecanolactam, dodecanolactam and 3- and 4-aminobenzoic acids.

Diamines suitable for use in the preparation of the polyamides include the straight chain and branched chain alkyl, aryl and alkaryl diamines. Such diamines include, for example, those represented by the general formula

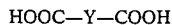

wherein n is an integer of from 2 to 16. Illustrative diamines are trimethylenediamine, tetramethylenediamine, pentamethylenediamine, octamethylenediamine, hexamethylenediamine (which is often preferred), trimethylhexamethylenediamine, m-phenylenediamine and m-xylylenediamine.

The dicarboxylic acids may be represented by the formula

HOOC—Y—COOH wherein Y is a divalent aliphatic or aromatic group containing at least 2 carbon atoms. Examples of aliphatic acids are sebacic acid, octadecanedioic acid, suberic acid, glutaric acid, pimelic acid and adipic acid. Aromatic acids, such as isophthalic and terephthalic acids, are preferred.

Typical examples of the polyamides or nylons, as these are often called, include polyamide-6, 66, 11, 12, 63, 64, 6/10 and 6/12 as well as polyamides from terephthalic acid and/or isophthalic acid and trimethylhexamethylenediamine; from adipic acid and m-xylylenediamines; from adipic acid, azelaic acid and 2,2-bis(p-aminocyclohexyl)propane and from terephthalic acid and 4,4'-diaminodicyclohexylmethane. Mixtures and/or copolymers of two or more of the foregoing polyamides or prepolymers thereof, respectively, are also within the scope of the present invention. Preferred polyamides are polyamide-6, 66, 11 and 12, most preferably polyamide-66.

Copolymer formation is believed to be the result of reaction between the dicarboxylate end groups of the polyphenylene ether and amine groups in the polyamide, forming imide linkages. Accordingly, the presence of a substantial proportion of amine end groups in the polyamide is preferred. If such amine end groups are not present in substantial proportion, partial degradation of the polyimide is necessary to enable the formation of the desired copolymers.

To prepare the copolymer compositions, the dicarboxylate-capped polyphenylene ether and polyamide are heated together in solution or, preferably, in the melt. Here, as in the operations previously described, melt processing under vacuum is especially preferred and extrusion with vacuum venting is most preferred. The reaction temperature is typically within the range of about 100°–350° C.

The proportions of functionalized polyphenylene ether and polyamide are not critical and may be adjusted over a wide range to yield copolymer compositions having the desired properties. The polyphenylene ether-polyamide compositions, however, generally contain about 5-75% by weight polyphenylene ether and about 25-95% polyamide.

In general, the copolymer compositions comprise only partially copolymer, with the balance being a polyphenylene ether-polyamide blend. It is also within the scope of the invention to incorporate uncapped polyphenylene ether in the composition, said uncapped polyphenylene ether frequently comprising up to about 50% by weight of total polyphenylene ether. In general, however, optimum properties are obtained when no uncapped polyphenylene ether is separately added.

The polyphenylene ether-polyamide compositions may also contain ingredients other than the copolymer, polyphenylene ether and polyamide. A particularly useful other ingredient in many instances is at least one elastomeric impact modifier which is compatible with the polyphenylene ether. It is generally present in the amount of about 5-25% by weight of resinous components.

Impact modifiers for polyphenylene ether-polyamide compositions are well known in the art. They are typically derived from one or more monomers selected from the group consisting of olefins, vinyl aromatic monomers, acrylic and alkylacrylic acids and their ester derivatives as well as conjugated dienes. Especially preferred impact modifiers are the rubbery high-molecular weight materials including natural and synthetic polymeric materials showing elasticity at room temperature. They include both homopolymers and copolymers, including random, block, radial block, graft and core-shell copolymers as well as combinations thereof.

Polyolefins or olefin-based copolymers employable in the invention include poly(1-butene), poly(4-methyl-1-pentene), propylene-ethylene copolymers and the like. Additional olefin copolymers include copolymers of one or more α-olefins with copolymerizable monomers including, for example, acrylic acids and alkylacrylic acids as well as the ester derivatives thereof including, for example, ethylacrylic acid, ethyl acrylate, methacrylic acid, methyl methacrylate and the like. Also suitable are the ionomer resins, which may be wholly or partially neutralized with metal ions.

A particularly useful class of impact modifiers are those derived from the vinyl aromatic monomers. These include, for example, modified and unmodified polystyrenes, ABS type graft copolymers, AB and ABA type block and radial block copolymers and vinyl aromatic conjugated diene coreshell graft copolymers. Modified and unmodified polystyrenes include homopolystyrenes and rubber modified polystyrenes, such as butadiene rubber-modified polystyrene (otherwise referred to as high impact polystyrene or HIPS). Additional useful polystyrenes include copolymers of styrene and various monomers, including, for example, poly(styrene-acrylonitrile) (SAN), styrene-butadiene copolymers as well as the modified alpha- and para-substituted styrenes and any of the styrene resins disclosed in U.S. Pat. No. 3,383,435, herein incorporated by reference. ABS types of graft copolymers are typified as comprising a rubbery polymeric backbone derived from a conjugated diene alone or in combination with a monomer copolymerizable therewith having grafted thereon at least one monomer, and preferably two, selected from the group consisting of monoalkenylarene monomers and substituted derivatives thereof as well as acrylic monomers such as acrylonitriles and acrylic and alkylacrylic acids and their esters.

An especially preferred subclass of vinyl aromatic monomer-derived resins is the block copolymers comprising monoalkenyl arene (usually styrene) blocks and conjugated diene (e.g., butadiene or isoprene) blocks and represented as AB and ABA block copolymers. The conjugated diene blocks may be selectively hydrogenated.

Suitable AB type block copolymers are disclosed in, for example, U.S. Pat. Nos. 3,078,254; 3,402,159; 3,297,793; 3,265,765 and 3,594,452 and UK Patent No. 1,264,741, all incorporated herein by reference. Examples of typical species of AB block copolymers are polystyrene-polybutadiene (SBR), polystyrene-polyisoprene and poly(alpha-methylstyrene)-polybutadiene. Such AB block copolymers are available commercially from a number of sources, including Phillips Petroleum under the trademark SOLPRENE.

Additionally, ABA triblock copolymers and processes for their production as well as hydrogenation, if desired, are disclosed in U.S. Pat. Nos. 3,149,182; 3,231,635; 3,462,162; 3,287,333; 3,595,942; 3,694,523 and 3,842,029, all incorporated herein by reference.

Examples of triblock copolymers include polystyrene-polybutadiene-polystyrene (SBS), polystyrene-polyisoprene-polystyrene (SIS), poly(α-methylstyrene)-polybutadiene-poly-(α-methylstyrene) and poly(α-methylstyrene)-polyisoprene-poly-(α-methylstyrene). Particularly preferred triblock copolymers are available commercially as CARIFLEX®, KRATON D® and KRATON G® from Shell.

Another class of impact modifiers is derived from conjugated dienes. While many copolymers containing conjugated dienes have been discussed above, additional conjugated diene modifier resins include, for example, homopolymers and copolymers of one or more conjugated dienes including, for example, polybutadiene, butadiene-styrene copolymers, butadiene-glycidyl methacrylate copolymers, isoprene-isobutylene copolymers, chlorobutadiene polymers, butadiene-acrylonitrile copolymers, polyisoprene, and the like. Ethylene-propylene-diene monomer rubbers may also be used. These EPDM's are typified as comprising predominantly ethylene units, a moderate amount of propylene units and up to about 20 mole percent of non-conjugated diene monomer units. Many such EPDM's and processes for the production thereof are disclosed in U.S. Pat. Nos. 2,933,480; 3,000,866; 3,407,158; 3,093,621 and 3,379,701, incorporated herein by reference.

Other suitable impact modifiers are the core-shell type graft copolymers. In general, these have a predominantly conjugated diene rubbery core or a predominantly cross-linked acrylate rubbery core and one or more shells polymerized thereon and derived from monoalkenylarene and/or acrylic monomers alone or, preferably, in combination with other vinyl monomers. Such core-shell copolymers are widely available commercially, for example, from Rohm and Haas Company under the trade names KM-611, KM-653 and KM-330, and are described in U.S. Pat. Nos. 3,808,180; 4,034,013; 4,096,202; 4,180,494 and 4,292,233.

Also useful are the core-shell copolymers wherein an interpenetrating network of the resins employed characterizes the interface between the core and shell. Especially preferred in this regard are the ASA type copolymers available from General Electric Company and sold as GELOY ™ resin and described in U.S. Pat. No. 3,944,631.

In addition, there may be employed the abovedescribed polymers and copolymers having copolymerized therewith or grafted thereon monomers having functional groups and/or polar or active groups. Finally, other suitable impact modifiers include Thiokol rubber, polysulfide rubber, polyurethane rubber, polyether rubber (e.g., polypropylene oxide), epichlorohydrin rubber, ethylene-propylene rubber, thermoplastic polyester elastomers and thermoplastic etherester elastomers.

The preferred impact modifiers are block (typically diblock, triblock or radial teleblock) copolymers of alkenylaromatic compounds and olefins or dienes. Most often, at least one block is derived from styrene and at least one other block from at least one of butadiene, isoprene, ethylene and butylene. Especially preferred are the triblock copolymers with polystyrene end blocks and olefin- or diene-derived midblocks. When one of the blocks is derived from one or more dienes, it is frequently advantageous to reduce the aliphatic unsaturation therein by selective hydrogenation. The weight average molecular weights of the impact modifiers are typically in the range of about 50,000–300,000. Block copolymers of this type are commercially available from Shell Chemical Company under the trademark KRATON, and include KRATON D1101, G1650, G1651, G1652, G1657 and G1702.

Other conventional ingredients which may be present in the copolymer-containing compositions include fillers, flame retardants, colorants, stabilizers, antistatic agents, mold release agents and the like, used in conventional amounts. The presence of other resinous components is also contemplated.

The preparation of polyphenylene ether-polyamide compositions is illustrated by the following example.

EXAMPLE 9

A mixture of equal weights of a commercial polyamide-66 and the capped polyphenylene ether of Example 3 was heated in the melt, cooled and extracted with toluene to remove uncopolymerized polyphenylene ether. It was found that 34% of the total polyphenylene ether present had been copolymerized with the polyamide.

What is claimed is:

1. A dicarboxylate-capped polyphenylene ether composition prepared by melt blending at least one polyphenylene ether with at least one compound of the formula

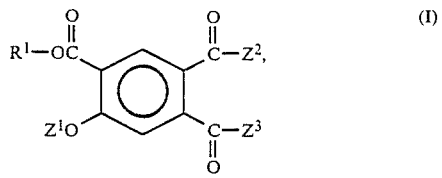

wherein $R^1$ is hydrogen, alkyl or a $C_{6-10}$ aromatic hydrocarbon radical, $Z^1$ is hydrogen or acyl, each of $Z^2$ and $Z^3$ is OH or $OR^2$ or $Z^2$ and $Z^3$ taken together are —O—, and $R^2$ is $C_{1-4}$ alkyl.

2. A composition according to claim 1 wherein the polyphenylene ether is a poly(2,6-dimethyl-1,4-phenylene ether).

3. A composition according to claim 2 wherein the materials blended consist essentially of said polyphenylene ether and said compound of formula I.

4. A composition according to claim 3 wherein $R^1$ is hydrogen, methyl or phenyl.

5. A composition according to claim 4 wherein $Z^2$ and $Z^3$ taken together are —O—.

6. A composition according to claim 5 wherein $Z^1$ is hydrogen or acetyl.

7. A composition according to claim 6 wherein the proportion of the compound of formula I is about 3–20% based on polyphenylene ether.

8. A composition according to claim 7 wherein $Z^1$ is hydrogen.

9. A composition according to claim 7 wherein $Z^1$ is acetyl.

10. A composition according to claim 7 wherein $R^1$ is hydrogen.

11. A composition according to claim 7 wherein $R^1$ is phenyl.

12. A composition comprising polyphenylene ethers having end groups of at least one of the formulas

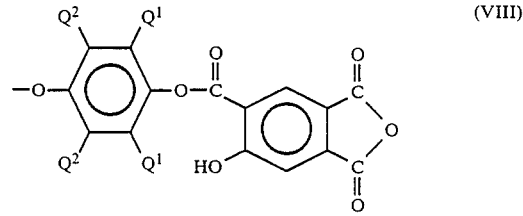

or

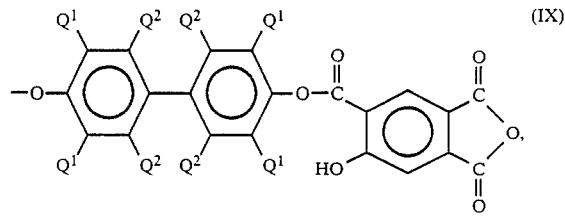

wherein each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

13. A composition according to claim 12 wherein each $Q^1$ is methyl and each $Q^2$ is hydrogen.

14. A composition according to claim 13 wherein $R^1$ is hydrogen, methyl or phenyl.

15. A composition according to claim 14 wherein $Z^2$ and $Z^3$ taken together are —O—.

16. A composition according to claim 15 wherein $Z^1$ is hydrogen or acetyl.

17. A composition according to claim 16 wherein $Z^1$ is hydrogen.

18. A composition according to claim 16 wherein $Z^1$ is acetyl.

19. A composition according to claim 16 wherein $R^1$ is hydrogen.

20. A composition according to claim 16 wherein $R^1$ is phenyl.

* * * * *